April 6, 1954  O. W. GRAHAM  2,674,363
CATALYST FLOW INDICATOR OR CONTROL
Filed Nov. 16, 1950
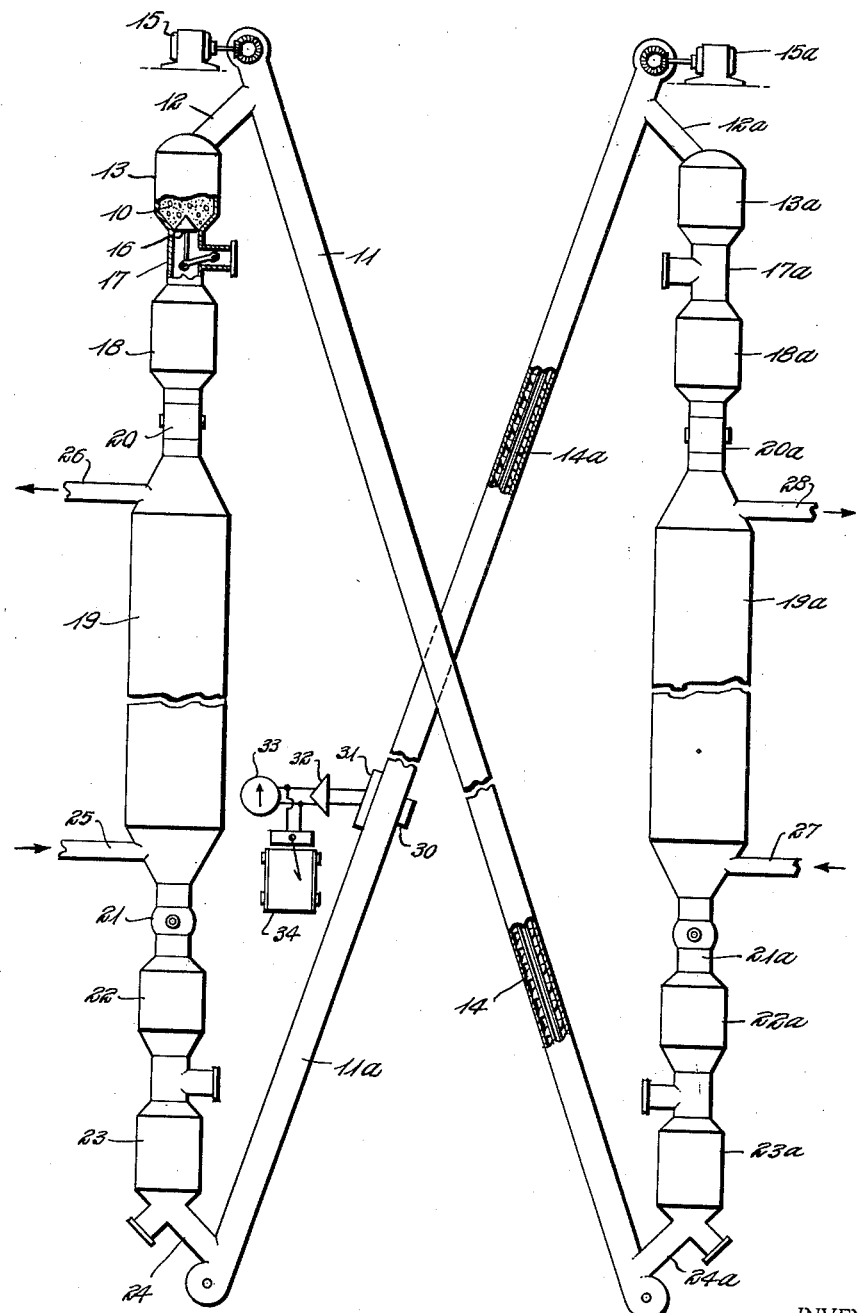
INVENTOR
Ollie W. Graham
BY Stevens, Davis, Miller & Mosher
ATTORNEYS

UNITED STATES PATENT OFFICE 2,674,363

CATALYST FLOW INDICATOR OR CONTROL

Ollie W. Graham, Tulsa, Okla., assignor to Instruments, Inc., Tulsa, Okla., a corporation of Oklahoma Application November 16, 1950, Serial No. 196,076

1 Claim. (Cl. 198—37)

This invention relates to a method and apparatus for measuring the rate of flow of a stream of a sub-divided material as it passes at a substantially constant velocity through a pipe, conduit, or other transporting means. More particularly this invention relates to a method and apparatus which will aid the operator of a catalytic process of the moving bed type in determining instantaneously the presence and amount of catalyst in the process. Additionally, the method and apparatus of this invention can be arranged to automatically control the amount of catalyst in the process.

It is oftentimes desirable to know the rate of flow of a stream of a sub-divided material through a pipe or conduit and more particularly in a closed circuit or system. However, it is generally very harmful to the flow of sub-divided material in the closed circuit to introduce therein means to measure its rate of flow. These harmful effects may stem from numerous causes, as for example, the introduction of the measuring means may affect the material deleteriously or it may present inhibitory effects into the material in the case of chemical reactions. Additionally, a versatile unit has always been sought, one which could be easily and quickly applied to any portion or part of a closed circuit or system in which was flowing at a substantially constant velocity a stream of a sub-divided material without interfering in any way with the flow of the material.

It is to be understood that this invention has wide applicability with all kinds of flowable sub-divided materials. Also, its use with liquids and the like flowing at a substantially constant velocity through a transporting means, such as a sewage pipe, is not precluded. However, for the purpose of presenting this invention in a clarifying manner, a particular class of materials will be selected for illustrative purposes. This class of materials will be sub-divided catalytic materials utilized in catalytic processes of the moving bed type. Therefore, it is a major object of this invention to provide a method and apparatus for measuring the rate of flow of a stream of a sub-divided material or the like through a pipe or other transporting means or in a closed system or circuit.

The common practice in a catalytic process is to first mingle a moving catalyst bed with the material or materials to be catalyzed, and subsequently to remove the catalyst bed from the material and subject it to revivification or regeneration in order to have the catalyst bed maintain a substantially constant effectiveness. During the process, however, the catalyst bed gradually diminishes. This is due primarily to abrasion of the catalyst bed as it moves and results in what is known in the art as fines. These fines are merely extremely small particles which are generally removed from the catalyst bed during its regeneration. Sometimes, however, these fines are created in the reaction zone and will, if the conditions are right, remain suspended and be removed with the reaction products. In either event, it is very difficult for the operator of the catalytic process to determine at any moment the presence and amount of catalytic material. Consequently, the reaction yield may be materially decreased due to a decrease in catalyst over a period of time before the operator will be apprised of this condition. Also, the catalyst bed may stop altogether and it may be some time before it is noticed by the operator.

To give the operator an indication of the amount of catalyst in the bed or of stoppages or to enable the catalyst bed to be automatically replenished some device must be employed which will accomplish the purpose of indicating or controlling the condition of the moving catalyst bed.

According to the present invention, a method and apparatus have been provided that enables an operator of a catalytic process to instantaneously determine the presence and amount of catalyst in a moving catalyst bed, and also enables automatic control of the catalyst bed.

The present method and apparatus takes advantage of the fact that catalytic materials as well as other sub-divided materials possess a recordable and indicatable degree of transparency to radioactive radiation, particularly gamma radiation. It also takes advantage of the fact that some radioactive radiation, particularly gamma radiation, will pass through a steel tube and can be detected and measured electrically.

Thus, by placing a source of radioactive radiation and a detector of that radiation in such a position that the catalyst as it moves through the system will pass between the source of radiation and the detector at a substantially constant velocity, it is possible by the method and means of this invention to determine instantaneously the presence and amount of catalyst material in the system and its rate of flow and these determinations can be indicated, recorded or used to operate a warning signal or any desired type of control for the purpose of automatically maintaining the catalyst material at substantially constant effectiveness.

Further objects and advantages of this invention will become obvious from the following detailed description of this invention when considered in conjunction with the appended drawing.

The drawing is a diagrammatic view of apparatus utilized with a catalytic process of the moving bed type and shows the way in which the presence and amount of catalyst and its rate of flow is indicated and controlled.

As illustrated in the drawing, a catalytic material 10 is fed through conveyor 11 for passage through duct 12 into a catalyst feeding hopper 13. The conveyor 11 is provided with any suitable conveying means 14, driven by any suitable means such as an electric motor 15. The feeding of the catalytic material 10 from the feeding hopper 13 is controlled by a cone-type valve 16 provided with hydraulic operating means not shown. The catalytic material 10 passes from the feeding hopper 13 through duct 17 into a sealing hopper 18, whence it is fed into the reaction chamber 19 by a rotary bucket type valve or "Star-Feeder" 20. The used catalytic material 10 is withdrawn from the reaction chamber 19 by a rotary bucket type valve or "Star-Feeder" 21. The opening and closing of the valves 20 and 21 can be synchronized so that the rate of feeding and rate of withdrawal of the catalytic material can be kept the same. The used catalytic material 10 passes into a sealing hopper 22, the discharge of which is controlled by a cone-type valve not shown. The used catalyst then passes into the lower sealing hopper 23, and afterwards passes through duct 24 and is fed by a constant speed conveyor 11a to the revivifying or regenerating operation. The materials undergoing treatment are introduced to the reaction chamber 19 through line 25 and the reaction products are withdrawn through line 26. The revivification or regeneration operation is carried out in similar apparatus as that for the reaction operation. Consequently, each element of the regenerative apparatus has been given the same numeral designation as its equivalent counterpart in the reactive apparatus. To fully identify, the letter $a$ is placed after each numeral designation for the regenerative apparatus. The material to regenerate the catalytic material 10 is introduced to the regenerator 19a through line 27 and withdrawn with the catalytic impurities by line 28. There is also provided in the regeneration operation means to remove the fines (not shown).

On the side of conveyor 11a is placed a source of radioactivity 30. This source of radioactive radiations is generally radium or some other source of gamma radiation. However, it can be a source of neutrons or other penetrating radioactive radiations. On the opposite side of constant speed conveyor 11a is placed a detector 31 of the type that detects the radioactive radiations given off by the source 30. It is preferred that a Geiger-Mueller counter be employed as the detector 31. However, the detector 31 can be an ionization chamber or it can be specially arranged to detect neutrons or some other special kind of radiations as distinguished from the more usual gamma radiations. The detector 31 is connected to an amplifier 32, which is usually of the preamplifier type and which is either powered by batteries contained in it or powered by some external source of power not shown. In a similar way, electrical power is supplied for the operation of the detector or Geiger-Mueller counter 31 which generally takes a direct current voltage of the order of approximately 200 volts.

The output from amplifier 32 is connected to an indicating device such as meter 33 and to a recording device such as pen-type recorder 34.

Inasmuch as the velocity of the catalyst material is kept constant by the conveyor 11a the meter 33 and recorder 34 can be calibrated to give direct readings in terms of rate of flow of the catalyst material. Consequently, the operator of the catalytic process, by watching meter 33 and recorder 34, will immediately become aware of any changes in the catalyst bed. Then, should the catalyst bed diminish to the point of deleteriously affecting the process, the operator will instantly have knowledge of this condition from meter 33 and recorder 34 and can replenish the moving catalyst bed to the proper amount.

In addition to the above arrangement, the output from amplifier 32 can be connected to any appropriate signaling, indicating, recording, or controlling devices. With regard to the matter of control, the output of amplifier 32 may be connected to an integrating device which in turn calculates the amount of catalyst present in the process. If the amount of catalyst falls below a predetermined figure, then new catalyst is automatically added to the process until the proper amount is reached. The control can also be established by making the addition of fresh catalyst responsive to the instantaneous amounts of catalysts passing between the source 30 and the detector 31.

It is oftentimes preferred in a large chemical installation to have a central control station remote from the several units desired to be controlled. In cases of this nature the detector 31 can be connected to a preamplifier situated at the locus of the unit and to place the amplifier 32 with the signaling, indicating, recording or controlling means at the central control station. Consequently, the output from the preamplifier is received and further amplified by the amplifier 32 at the point at which it is desired to indicate, record, control or otherwise. This arrangement is deemed very practical under circumstances where the recording, controlling or indicating is remote from the detecting.

While this invention has been described in a specific embodiment, nevertheless various changes and modifications obvious to one skilled in the art, without departing from the spirit and scope of this invention, can be made.

I claim:

The method of controlling the condition of a catalyst bed in a catalytic process of the moving bed type that comprises moving said catalyst at a constant velocity at one point, passing penetrating radioactive radiation through said catalyst bed at said point, detecting said radiation after it has passed through said catalyst bed, converting said radiation into electrical signals indicative of the intensity of said radiation, and causing said electrical signals to actuate feeding means to introduce fresh catalyst responsive to the condition of the catalyst bed to maintain the catalyst bed at substantially constant effectiveness.

References Cited in the file of this patent

UNITED STATES PATENTS

| Number | Name | Date |
|---|---|---|
| 1,808,709 | Blake | June 2, 1931 |
| 2,323,128 | Hare | June 29, 1943 |
| 2,453,456 | Piety | Nov. 9, 1948 |
| 2,456,233 | Wolf | Dec. 14, 1948 |
| 2,487,797 | Friedman et al. | Nov. 15, 1949 |
| 2,534,352 | Herzog | Dec. 19, 1950 |